US008889094B2

(12) United States Patent
Helberg

(10) Patent No.: US 8,889,094 B2
(45) Date of Patent: Nov. 18, 2014

(54) PURIFICATION OF TICL$_4$ THROUGH THE PRODUCTION OF NEW CO-PRODUCTS

(75) Inventor: Lisa Edith Helberg, Middletown, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/980,582

(22) PCT Filed: Feb. 22, 2012

(86) PCT No.: PCT/US2012/026196
§ 371 (c)(1),
(2), (4) Date: Jul. 19, 2013

(87) PCT Pub. No.: WO2012/116120
PCT Pub. Date: Aug. 30, 2012

(65) Prior Publication Data
US 2013/0302228 A1 Nov. 14, 2013

Related U.S. Application Data

(60) Provisional application No. 61/445,792, filed on Feb. 23, 2011, provisional application No. 61/445,801, filed on Feb. 23, 2011.

(51) Int. Cl.
*C01G 23/00* (2006.01)
*C22B 34/12* (2006.01)
*C01G 23/02* (2006.01)
(52) U.S. Cl.
CPC ......... *C22B 34/1259* (2013.01); *C01P 2006/80* (2013.01); *C01G 23/024* (2013.01)
USPC ............................. 423/492; 423/87; 423/494

(58) Field of Classification Search
None
See application file for complete search history.

(56) References Cited

U.S. PATENT DOCUMENTS

| | | | | |
|---|---|---|---|---|
| 2,370,525 | A | * | 2/1945 | De Witt ........................... 423/83 |
| 2,416,191 | A | | 2/1947 | Meister |
| 4,783,324 | A | | 11/1988 | Walter et al. |
| 7,368,096 | B2 | | 5/2008 | Gu et al. |
| 2002/0179427 | A1 | * | 12/2002 | Goddard et al. ................. 203/29 |

OTHER PUBLICATIONS

International Search Report, PCT/US2012/026196, Dated May 31, 2012.

* cited by examiner

*Primary Examiner* — Steven Bos

(57) ABSTRACT

The present disclosure relates to reacting tin metal with crude TiCl$_4$ containing arsenic to produce pure TiCl$_4$, SnCl$_4$, and an arsenic solid co-product. In some embodiments, the contaminant vanadium is removed as well. In another embodiment, the vanadium is removed separately through a commercial process and the resulting arsenic containing commercial grade of purified TiCl$_4$ is reacted with elemental tin, sulfur and ferric chloride to substantially reduce the arsenic. The reaction is preferably done in a continuous fashion in two stages for maximum through-put and utility at an elevated temperature. Distillation can be used to purify the TiCl$_4$ produced and simultaneously yield a purified SnCl$_4$ product. The synthesis of SnCl$_4$ in this method utilizes waste chloride to save virgin chlorine which would otherwise be used.

5 Claims, No Drawings

US 8,889,094 B2

PURIFICATION OF TICL$_4$ THROUGH THE PRODUCTION OF NEW CO-PRODUCTS

This application claims the benefit of U.S. Provisional Application No. 61/445,792, filed Feb. 23, 2011, and U.S. Provisional Application No. 61/445,801 filed Feb. 23, 2011, which are each incorporated by reference in their entireties.

FIELD OF THE INVENTION

This invention relates to a process for purifying TiCl$_4$ produced via a chloride process.

BACKGROUND OF THE INVENTION

Pigmentary TiO$_2$ is commercially produced through the sulfate or the chloride process. The chloride process is also used to produce TiCl$_4$ for titanium metal production. In the chloride process, titanoferrous ore is carbochlorinated to produce TiCl$_4$ and a range of other metal chlorides from the ore impurities. The crude TiCl$_4$ produced in the carbochlorination is processed with a series of physical separation steps to produce a usable TiCl$_4$ product. One contaminating element found in titanoferrous ore is arsenic. The chlorination of the arsenic species present in the ore produces AsCl$_3$. AsCl$_3$ has a boiling point very similar to that of TiCl$_4$, making removal more problematic.

Different ores can contain significantly different levels of arsenic ranging from non-detectable to greater than 100 ppm. Standard purification methods for the chloride process involve first removing solids chlorides and then removing vanadium in a separate step. AsCl$_3$ is a liquid, so it is not removed by the solids removal steps. Known vanadium removal steps such as organic treating agents, like plant and animal oils, soaps, fats and waxes, do not react with AsCl$_3$. Another known commercial process is using elemental copper to remove vanadium from crude TiCl$_4$. Copper also shows no reactivity to AsCl$_3$. As a result, all of the AsCl$_3$ that forms from chlorination is present in the pure TiCl$_4$ sent to oxidation and can end up in the TiO$_2$ product. High levels of arsenic are undesirable in TiO$_2$ pigment. Pigmentary TiO$_2$ used in FDA products such as cosmetics require <1 ppm arsenic by the FDA method. Low levels are also desired in other pigmentary application such as some plastics and coatings products. Arsenic levels in TiCl$_4$ used to produce titanium metal must also be kept low to avoid deformations in the final metal pieces. Typical levels for TiCl$_4$ for titanium metal are <10 ppm arsenic.

Since AsCl$_3$ passes through all the known vanadium removal processes, such as organic treatment or copper metal, all the AsCl$_3$ will end up in the purified TiCl$_4$. If high concentrations of arsenic were present in the ore, elevated levels of AsCl$_3$ will also be present. Two technologies are known to remove AsCl$_3$ from pure TiCl$_4$. If a partial reduction of the concentration from, for example, 100 ppm to 10 ppm is all that is required, distillation can be used with effective production of the desired product, but a significant yield loss of TiCl$_4$ is also required. Lower concentrations can also be achieved at greater penalties for energy consumption and equipment sizing. AsCl$_3$ has little commercial value. Arsenic is currently only used in a few specific applications, and each of these requires a high purity level, such as gallium arsenide production. As a result, using distillation to produce a highly concentrated AsCl$_3$ product would reduce the yield loss of TiCl$_4$ but would not yield a useful product. The AsCl$_3$/TiCl$_4$ stream would need disposal in a proper manner. Since the boiling points of AsCl$_3$ and TiCl$_4$ are so close, only 6° C. apart, a large amount of energy would be required to produce this waste stream.

Another potential method for removing AsCl$_3$ from purified TiCl$_4$ is to use carbon adsorption. This method does not work on crude TiCl$_4$. Carbon adsorption CaO remove the AsCl$_3$ to very low levels that would be suitable for all applications including cosmetics. However, the carbon adsorption is not selective for only AsCl$_3$. Many other species are present in the pure TiCl$_4$ such as the sulfur gases produced from the carbochlorination, like SO$_2$, COS, and CS$_2$. These species will adsorb competitively on to the carbon, limiting the capacity. As a result, this method is not commercially viable for large scale production such as pigmentary TiO$_2$ for large markets like plastics and coatings.

Thus, the problem to be solved is removal of AsCl$_3$ from TiCl$_4$ produced via the chloride process in an economical, efficient, and safe manner.

SUMMARY OF THE INVENTION

Applicants have solved the aforementioned problems by using tin metal to remove arsenic from crude TiCl$_4$ produced via the chloride process. A separate process can also be applied to partially purified TiCl$_4$ where some of the impurities such as vanadium are first removed using known techniques which do not remove the arsenic. Tin metal is then reacted with the arsenic in a separate treatment step.

One aspect is for a process for the purification of crude TiCl$_4$ comprising contacting arsenic-containing crude TiCl$_4$ with tin to produce purified TiCl$_4$, SnCl$_4$, and solid arsenic and separating the solid arsenic from the purified TiCl$_4$ and SnCl$_4$. In some aspects, the contacting and separating steps are performed by a two stage process comprising reducing the arsenic content in the arsenic-containing crude TiCl$_4$ by contacting the arsenic-containing crude TiCl$_4$ with a less than excess amount of tin to produce partially purified TiCl$_4$, SnCl$_4$, and solid arsenic; separating the solid arsenic from the partially purified TiCl$_4$ and SnCl$_4$; further reducing the arsenic content in the partially purified TiCl$_4$ by contacting the partially purified TiCl$_4$ with an excess of tin to produce purified TiCl$_4$, SnCl$_4$, solid arsenic, and excess tin; and separating the solid arsenic and excess tin from the purified TiCl$_4$ and SnCl$_4$.

Another aspect is for a process for the purification of crude TiCl$_4$ comprising contacting arsenic- and vanadium-containing crude TiCl$_4$ with tin to produce purified TiCl$_4$, SnCl$_4$, solid arsenic, and solid vanadium and separating the solid arsenic and solid vanadium from the purified TiCl$_4$ and SnCl$_4$. In some aspects, the contacting and separating steps are performed by a two stage process comprising reducing the arsenic and vanadium content in the arsenic- and vanadium-containing crude TiCl$_4$ by contacting the arsenic- and vanadium-containing crude TiCl$_4$ with a less than excess amount of tin to produce partially purified TiCl$_4$, SnCl$_4$, solid arsenic, and solid vanadium; separating the solid arsenic and the solid vanadium from the partially purified TiCl$_4$ and SnCl$_4$; further reducing the arsenic and vanadium content in the partially purified TiCl$_4$ by contacting the partially purified TiCl$_4$ with an excess of tin to produce purified TiCl$_4$, SnCl$_4$, solid arsenic, solid vanadium, and excess tin; and separating the solid arsenic and the solid vanadium and excess tin from the purified TiCl$_4$ and SnCl$_4$.

In another embodiment of this invention, crude TiCl$_4$ from the chloride process, containing vanadium, arsenic and other impurities, is purified in separate reactors. In the first reactor, vanadium is removed from the crude TiCl$_4$ using one of the previously known technologies such as reaction with copper metal or organic materials such as fats, oils, waxes and soaps. No arsenic is removed with this purification strategy. A solid, insoluble vanadium product is produced along with a solid product from the specific vanadium removal agent chosen. The entire reaction mass can then be contacted with tin metal to remove the arsenic dissolved in the $TiCl_4$. The arsenic and vanadium containing solids can then be removed from the purified $TiCl_4$ through distillation resulting in a vanadium and arsenic free $TiCl_4$ and $SnCl_4$ stream.

Another embodiment involves standard purification techniques to first produce a commercial purified $TiCl_4$ stream substantially free of vanadium but still containing arsenic. The commercial purification of $TiCl_4$ involves contacting the crude vanadium and arsenic containing $TiCl_4$ with copper metal or a commercial organic treating agent followed by distillation to produce a colorless, $TiCl_4$ stream containing arsenic. Using this commercial purified $TiCl_4$ as a starting material, the following process of the present invention then removes arsenic. The arsenic containing commercial purified $TiCl_4$ is then mixed with elemental sulfur, ferric chloride and elemental tin. This second treatment step removes the arsenic in the $TiCl_4$ producing a solid arsenic product and $SnCl_4$. The solids are separated from the $TiCl_4$ and $SnCl_4$ product.

Other objects and advantages will become apparent to those skilled in the art upon reference to the detailed description that hereinafter follows.

DETAILED DESCRIPTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In the production of $TiCl_4$ for a commercial process, several stages of purification may be required depending on the specifics of the process, the starting materials, and the final product $TiCl_4$ requirements. First, the $TiO_2$-bearing ore is carbochlorinated by mixing with a carbon source and chlorine at high temperature. Carbochlorination produces a vapor stream containing most of the impurities present in the ores now converted into metal chlorides along with the $TiCl_4$ vapor. This vapor stream is condensed, causing high boiling impurity metal chlorides to condense into solids. Most of the solid metal chlorides and fine solid particles that may have traveled from the chlorination step are separated from the condensed liquid $TiCl_4$. Many of the gases from the carbochlorination step are further separated from the condensed liquid $TiCl_4$. This condensed liquid $TiCl_4$ stream contains any of the liquid metal chlorides that were produced in the carbochlorination such as vanadium oxychloride, vanadium tetrachloride, arsenic trichloride, tin tetrachloride, and silicon tetrachloride. It may also contain dissolved solid metal chlorides such as ferric chloride, ferrous chloride, aluminum trichloride, and niobium pentachloride and dissolved gases such as $CO_2$ and $SO_2$. This condensed liquid $TiCl_4$ stream containing a variety of impurities is referred to as "crude $TiCl_4$". Crude $TiCl_4$ is a process stream that is not suitable for the production of a commercial product such as $TiO_2$ or titanium metal without further purification.

Crude $TiCl_4$ is subjected to further purification steps to remove more of the impurities. The amount of additional purification depends on the requirements of the end use. At a minimum, all of the solids must be removed, any vanadium species present must be substantially reduced, and dissolved solids such as ferric chloride must be removed. This purification step may be accomplished for example by a combination of a chemical treatment of the vanadium species, such as with copper or organic treating agents, followed by a solids separation step such as distillation. The resulting $TiCl_4$ stream may still contain miscible liquid chlorides such as arsenic trichloride, tin tetrachloride, and silicon tetrachloride, but it does not contain significant quantities of vanadium or solids. This stream may be considered a "pure $TiCl_4$" stream that is suitable for some commercial applications. A commercial pure $TiCl_4$ stream may be further classified into different grades depending on the impurity levels. For example, a general $TiO_2$ grade of $TiCl_4$ may be designated as a stream suitable for the production of $TiO_2$ through oxidation. This $TiCl_4$ stream may contain elevated levels of arsenic, tin, and silicon. It may not be suitable for the production of all types of $TiO_2$ desired. A separate grade may contain lower levels of arsenic, tin, and silicon and be suitable for the production of all types of $TiO_2$ as well as use in the production of Ti-based catalysts. Further grade specifications could be made for lower levels of impurities of arsenic, tin, silicon and so forth that would be suitable for use in the production of titanium metal. A general $TiO_2$ grade $TiCl_4$ could also be designated as suitable for the use in the production of higher quality grades of $TiCl_4$ such as producing a more purified $TiCl_4$ stream suitable for titanium metal.

When tin metal is reacted with the arsenic in the crude $TiCl_4$ (i.e., titanium tetrachloride produced by a chloride process, which has been subjected to partial purification procedures to remove some metal chlorides), a solid arsenic product is produced along with $SnCl_4$. This treatment process works with all ranges of arsenic seen in the variety of ores available with levels from 10 ppm to 100 ppm arsenic but has not been seen to have any limitations either with lower or higher concentrations. $SnCl_4$ is a liquid, not a solid like copper chloride. As a result, the $SnCl_4$ does not contaminate the arsenic solid. Tin metal, being a milder reducing agent, also does not appear to react with $TiCl_4$, unlike copper metal. As a result, a simple two stage reactor system can be used with tin powder with essentially no extra yield loss of $TiCl_4$ or tin through reaction with the purified $TiCl_4$. By the term "purified $TiCl_4$" it is meant that the concentration of the arsenic in the $TiCl_4$ is at least significantly lowered if not reduced to a level below that which can be detected by known analytical techniques. The product $TiCl_4$ has arsenic removed to a level suitable for use in the production of $TiO_2$ or titanium metal. The $TiO_2$ may be suitable for use in applications where lower arsenic concentrations are desired.

In the step of contacting the crude $TiCl_4$ with the tin material, the tin can be added to the $TiCl_4$ by any suitable addition or mixing method. The tin can be added as a fine powder using known engineering methods such as a star valve or screw feeder with appropriate consideration made for controlling $TiCl_4$ vapors back flowing into the system. Mixing of the tin powder with the crude $TiCl_4$ may be done with agitation such as paddle mixer, sparging, or other engineering methods appropriate for the difficulties associated with handling $TiCl_4$. In some embodiments, the amount of tin added to the crude $TiCl_4$ is an excess amount. For a given equipment size and temperature, the rate of the reaction will be adjusted by the amount of excess tin added. When a single stage configuration is used, excess amounts could be very high, such as 20 times excess. A two stage configuration allows less excess to be used in the final stage, and lower amounts such as eight times excess can be used. The excess used in the final stage is also utilized later in the first stage.

$SnCl_4$ can be separated from the resulting pure $TiCl_4$ through, for example, distillation. $SnCl_4$ is a valuable product used as a catalyst and the starting material for the production of organometallic tin compounds that are used in a wide variety of applications. So, in this process, a valuable co-product is produced, and many other technical problems are eliminated.

First, by converting liquid $AsCl_3$ into a solid, disposal of the arsenic atoms becomes much easier. Liquid $AsCl_3$ is a water reactive, corrosive material that releases HCl upon contact with atmospheric moisture. As such, it cannot be disposed of directly. If it was removed from the product $TiCl_4$ stream through distillation, it would be mixed with larger concentrations of $TiCl_4$, which is also a water reactive, corrosive material that releases HCl upon contact with atmospheric moisture, and both liquids would need to be converted into a different product before disposal. By converting the $AsCl_3$ into a solid as part of the removal process and then separating all of the $TiCl_4$ from the solid, a less hazardous material is produced. The residual solid is not contaminated with treating agent such as copper chloride or organic residue that must be separated since $SnCl_4$ was formed and already separated. This separation also produces a much smaller stream to handle. This stream might be much easier to convert into an acceptable form for landfill or other appropriate disposal.

Second, while a distillation step would still be required to recover $SnCl_4$, the energy intensity would be lower to produce the $TiCl_4$ product. For $TiO_2$ production in the chloride process, significantly higher concentrations of $SnCl_4$ are allowed in the $TiCl_4$ since the Sn does not end up incorporated into the final $TiO_2$ product, in some embodiments. So, the initial separation where a lower $SnCl_4$- and much lower $AsCl_3$-containing $TiCl_4$ product is produced from the bottom of the $SnCl_4$ distillation column, would experience two benefits: (1) an increase in the separation of the boiling points of the two species being separated and (2) an increase in the amount of tolerated contamination in the product $TiCl_4$. So, for example, a starting crude $TiCl_4$ with 100 ppm As might have to be distilled to reduce the arsenic level to 10 ppm As. With a 6° C. difference in the boiling points, 130° C. for $AsCl_3$ and 136° C. for $TiCl_4$, a large column with many trays and considerable energy input would be required. If this process were used on the crude $TiCl_4$ to reduce the $AsCl_3$ from 100 ppm to 10 ppm As, then the only extra energy input required would be to reduce the $SnCl_4$ concentration. Some $SnCl_4$ is present in crude $TiCl_4$ to start due to the ore composition. As a result, the $SnCl_4$ concentration might need to be reduced from 2000 ppm to 1000 ppm in the product $TiCl_4$; however, that reduction is much easier to achieve, plus a 22° C. difference in the boiling points exists between the 114° C. for $SnCl_4$ and 136° C. for $TiCl_4$. Now the extra energy can be applied to converting the high $SnCl_4$ material into a suitable product.

Third, a valuable product is produced in the reaction instead of material with disposal issues. $SnCl_4$ is typically made through the reaction of tin metal and chlorine at elevated temperatures. In this reaction, instead of using virgin chlorine, the chloride ligand is obtained in the purification process. These chlorine ligands would be lost, for example through the copper chloride disposal in other systems. In this case, the chloride, an expensive and energy intensive reagent, is conserved instead of lost.

Fourth, no opportunity for undesirable production of Persistent Bio-accumulative and Toxic (PBT) organic compounds exists because no carbon is introduced into the system. When organic treating agents are used, the combination of heat, chlorine and carbon can under some conditions produce PBTs such as chlorinated dioxins and furans.

Finally, tin provides an opportunity to simultaneously remove both vanadium and arsenic in one unit operation. Using carbon adsorption to remove the arsenic would first require a traditional purification step such as organic treating agents, followed by a separate unit operation for the arsenic removal. If very low $AsCl_3$ levels were required, such as <1 ppm As, and low levels of $SnCl_4$ were also required, a distillation column might also be required to meet the final product specifications.

However, it is not a requirement that vanadium and arsenic be removed in the same unit operation. For example, it may be desired to only remove $AsCl_3$ from a portion of a plant's total $TiCl_4$ production, Traditional vanadium removal technologies could be applied followed by arsenic removal from part of the $TiCl_4$ after the vanadium removal stage. Alternatively, removing the arsenic only with tin produces lower concentrations of $SnCl_4$. The small amounts of $SnCl_4$ produced might eliminate the requirement for a separation of $SnCl_4$ and $TiCl_4$ to produce $TiO_2$ from the arsenic and vanadium free $TiCl_4$ stream.

In some embodiments, the $SnCl_4$ is subsequently recovered from the $TiCl_4$. This separation can be accomplished through, for example, distillation. All of the $SnCl_4$ does not need to be removed from the $TiCl_4$ for the $TiCl_4$ to be used for $TiO_2$ production. Most of the $SnCl_4$ could be recovered in this process and recycled to produce a more concentrated $SnCl_4$ stream. The concentration of $SnCl_4$ does not impact the rate of the arsenic removal step. One example of the separation of $TiCl_4$ and $SnCl_4$ would involve two separate distillation columns. The first column would be fed the product from the vanadium and arsenic removal stage or just arsenic removal final stage to the upper portion of the column. $TiCl_4$ suitable for commercial use would be collected from the bottom of the first column. The purity requirements for $TiCl_4$ used for $TiO_2$ or titanium metal manufacture would determine the configuration of this column, typically set using Aspen modeling conditions or similar engineering principles. The stream collected from the top of the first column would provide the reflux flow to the first column and feed a second column. The second column would be used to produce a finished $SnCl_4$ product from the top of the column. The material from the bottom of the second column would be high in $TiCl_4$ and lower in $SnCl_4$. The bottom material would be recycled to the tank used to provide the reflux to the first column. In this manner, no $TiCl_4$ would be lost while conserving energy. The size of the columns and number of trays would be related to the total purification strategy for the crude $TiCl_4$ since that will determine the amount of $SnCl_4$ present. $SnCl_4$ can also be present in crude $TiCl_4$ due to tin oxide in the ores. The $SnCl_4$ from the crude $TiCl_4$ will also be accounted for in the distillation.

One embodiment is for crude $TiCl_4$ to be purified in two stages. In the first stage, the arsenic concentration is only partially reduced so that the tin metal reaction can be driven to completion. The solid arsenic product is separated from this stage and a liquid (or vapor) $TiCl_4$ stream containing arsenic is transferred to a second stage. This step preferably occurs at least at 100° C. More preferably, this step occurs under pressure at temperatures elevated above the boiling point of $TiCl_4$ (about 150° C. to about 200° C. range). The arsenic solids can be collected in a drying chamber, for example a drying chamber found after a purge separation (see, e.g., U.S. Pat. No. 7,368,096, incorporated herein by reference). Alternatively, they may be collected by other known engineering methods such as, for example, distillation.

In the second stage, the arsenic is removed to the desired low levels and excess tin metal is present. The excess tin metal stream (containing some arsenic solid) is removed and can be sent to the first stage for further reaction. The $TiCl_4/SnCl_4$ with a substantially reduced arsenic concentration is then separated, in one embodiment in a distillation column.

In another embodiment, the purification of crude $TiCl_4$ containing vanadium and arsenic is done with separate treating agents. Many examples are known to remove vanadium. The intended purpose of the purified $TiCl_4$ can dictate the choice of vanadium removing species. For example, if the final $TiCl_4$ product will be used to manufacture titanium metal through the Kroll process, copper metal may be used since organic based treating agents can introduce carbon into the purified $TiCl_4$ as the vanadium is removed. For $TiCl_4$ used in the manufacture of $TiO_2$, organic treating agents, such as fats, oils, waxes, and soaps may be used. Neither copper nor organic treating agents remove arsenic from the $TiCl_4$. When both vanadium and arsenic need to be removed from the $TiCl_4$, removal of the arsenic may be accomplished separately.

When using copper metal to remove vanadium from crude $TiCl_4$, a copper powder may be used producing a copper chloride and solid vanadium mixture in $TiCl_4$. The slurry mixture could subsequently be mixed with tin powder removing the arsenic from the $TiCl_4$ and producing arsenic solids and $SnCl_4$. The entire reaction mixture could then be separated from the solids, for example by distillation, producing a $TiCl_4$ and $SnCl_4$ stream separated from the vanadium and arsenic contamination. This procedure could alternatively be accomplished using an organic treating agent to remove the vanadium. The reaction of the organic treating agent and the vanadium produces a solid vanadium species mixed with residual solid carbon material. This slurry could also be subsequently mixed with elemental tin to remove the arsenic in a separate step.

In another embodiment, separate stages could be used. In the first stage, crude $TiCl_4$ containing vanadium and arsenic is reacted with a vanadium treating agent such as copper metal or a suitable organic material. The vanadium-free $TiCl_4$, containing arsenic, is then separated from the solids by distillation. The resulting arsenic containing $TiCl_4$ stream is then mixed with elemental sulfur, ferric chloride and elemental tin. The reaction mixture is then separated to produce a solid arsenic stream and a $TiCl_4$ and $SnCl_4$ stream purified of vanadium and arsenic.

Removing the vanadium first from the vanadium and arsenic containing crude $TiCl_4$ might be more cost effective or allow better utilization of existing equipment. For example, if it was desirable to only remove a portion of the arsenic content of the crude $TiCl_4$ to meet the product requirements, the entire volume of crude $TiCl_4$ would not need to be treated. Smaller equipment sizing and handling would be required to remove the arsenic a portion of the $TiCl_4$ after the vanadium was removed. Since the vanadium content is higher than the arsenic content, less $SnCl_4$ would be produced. Less $SnCl_4$ might be desirable under some circumstances. The solids produced from a mixed method of removing the two contaminants would not be improved as in the method of using tin to remove both vanadium and arsenic.

Distillation may be operated in different methods depending on the end use of the $TCl_4$. In one embodiment, the initial $TiCl_4/SnCl_4$ mixture is sent to a rough distillation column where a stream containing low enough amounts of $SnCl_4$ in $TiCl_4$ is produced from the bottom of the column and a high $SnCl_4$ stream is produced from the top of the column. The bottom stream of $TiCl_4$ can be used to produce $TiO_2$. The top stream can be sent to a polishing distillation column which is used to produce a pure $SnCl_4$ stream from the top and a rough $TiCl_4/SnCl_4$ stream from the bottom. The bottom stream from this column can be recycled back to the start of the first distillation column. Through the use of multiple distillation columns, essentially no $TiCl_4$ yield loss occurs and both a $TiCl_4$ product and $SnCl_4$ product can be produced. A third distillation column (or batch operation of the second distillation column) can be used in some embodiments to produce a $TiCl_4$ product ideal for titanium metal production. The benefit of using elemental tin compared to organic treating agents is no organic residue is present in the $TiCl_4$, which is highly detrimental to the titanium metal.

In some embodiments, the contaminant vanadium is also removed by a process described herein. The vanadium chlorination products, $VOCl_3$ or $VCl_4$, have boiling points close to that of $TiCl_4$, which makes removal problematic. When tin metal is reacted with the vanadium in the crude $TiCl_4$, a solid vanadium product is produced along with $SnCl_4$. This treatment process works with all ranges of vanadium seen in the variety of ores available with levels from 100 ppm V to 3000 ppm V but has not been seen to have any limitations either with lower or higher concentrations. As with arsenic noted above, the $SnCl_4$ does not contaminate the vanadium solid.

The product $TiCl_4$ has vanadium removed to a level suitable for use in the production of $TiO_2$ or titanium metal. Additionally, vanadium can be lowered to an operator specified concentration.

Vanadium can be removed using either the one stage or two stage process described above for arsenic. The solid vanadium product that is produced by a process using only tin described herein is suitable to become a feedstock into other processes such as the production of steel.

The $TiCl_4$ product of the process described herein can be used in any application for which titanium tetrachloride is useful. The $TiCl_4$ can be used as a starting material for making titanium dioxide and derivatives thereof especially as a feedstream for the well-known chlorination and oxidation processes for making titanium dioxide.

Titanium dioxide can be suitable for use as a pigment. The majority of $TiO_2$ produced is used for this property. Common applications are in paints, paper and plastics. The $TiCl_4$ produced in this process is suitable for use in production of $TiO_2$ for all of these applications.

Titanium dioxide is useful in, for example, compounding; extrusion of sheets, films and shapes; pultrusion; coextrusion; ram extrusion; spinning; blown film; injection molding; insert molding; isostatic molding; compression molding; rotomolding; thermoforming; sputter coating; lamination; wire coating; calendaring; welding; powder coating; sintering; cosmetics; and catalysts.

Alternatively, titanium dioxide can be in the nano-size range (average particle diameter less than 100 nm), which is usually translucent or transparent. $TiO_2$ of this particle size range is typically used for non-optical properties such as photo-protection.

The $TiCl_4$ from this process is also suitable for use to produce titanium metal through any of the known commercial pathways such as the Kroll and Hunter processes. The $TiCl_4$ is also suitable for use in the production of titanium based catalysts such as organo-titanates or Ziegler-Natia type catalysts.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modification of the invention to adapt it to various uses and conditions.

Example 1

Crude $TiCl_4$ and One Stage Removal with Elemental Sn

A 100 mL aliquot of commercial crude $TiCl_4$ was added into a 250 mL reaction flask equipped with a magnetic stirrer, heating mantle, powder addition funnel and Dean Stark trap for condensate collection. The crude $TiCl_4$ contained a range of impurities including vanadium, iron and other elements including $SnCl_4$ plus 36 ppm arsenic as $AsCl_3$. The dark yellow $TiCl_4$ was mixed with 2.0 g of powdered elemental Sn (<45 micron size, Aldrich, 98.8%) and then heated to reflux. The $TiCl_4$ and Sn were refluxed together for 3 hours. All of the color was removed from the distillate. The $TiCl_4$ was then distilled from the solids. The overheads were measured to contain <1 ppm V and <5 ppm As. They also contained 2000 ppm of Sn which includes the $SnCl_4$ which was present in the crude $TiCl_4$.

Example 2

Crude $TiCl_4$ and Two Stage Removal with Elemental Sn

A 100 mL aliquot of commercial crude $TiCl_4$ was added into a 250 mL reaction flask equipped with a magnetic stirrer, heating mantle, powder addition funnel and Dean Stark trap for condensate collection. The crude $TiCl_4$ contained a range of impurities including vanadium, iron and other elements including $SnCl_4$ plus 40 ppm arsenic as $AsCl_3$. The dark yellow $TiCl_4$ was heated to 100° C. and mixed with 1.2 g of powdered elemental Sn (<45 micron size, Aldrich, 98.8%). The $TiCl_4$ and Sn were refluxed together for 12 hours to ensure that an endpoint had been achieved. The distillate was still a strong yellow color indicating that only a portion of the vanadium was removed. Another 1.1 g of Sn was then added. The slurry was refluxed for 1 more hour. All of the color was removed from the distillate. The $TiCl_4$ was then distilled from the solids. The overheads were measured to contain <1 ppm V and <5 ppm As. They also contained 2000 ppm of Sn which includes the $SnCl_4$ which was present in the crude $TiCl_4$.

Example 3

Stock Arsenic Contaminated $TiCl_4$ and Treatment with Tin

A stock solution containing 37 ppm Arsenic as $AsCl_3$ in $TiCl_4$ was prepared. The $TiCl_4$ had been previously purified to 99.95% $TiCl_4$ using a combination of vanadium removal with a commercial process of an organic treating agent, followed by distillation. A simple reaction flask was assembled containing a 250 mL round bottom flask, a magnetic stirrer, a heating mantle, and a powder addition funnel. For collection of the distillate, a simple Dean Stark trap was used with a large dry ice trap attached. A 100 mL aliquot of the colorless stock solution was added to the round bottom flask. At room temperature, 2.1 g of powdered elemental Sn (<45 micron size, Aldrich, 98.8%) was added all together to the flask using the powder addition funnel. The mixture was heated to reflux temperature and held at reflux for 4 hours. The colorless TiCl4 was then distilled from the solids and collected using the Dean Stark trap. The overheads were measured to contain 36 ppm As.

Example 4

Commercial Arsenic Contaminated $TiCl_4$ and Treatment Tin, Sulfur and Ferric Chloride A 100 mL aliquot of commercial purified $TiCl_4$ was added into a 250 mL reaction flask equipped with a magnetic stirrer, heating mantle, powder addition funnel and Dean Stark trap for condensate collection. The $TiCl_4$ contained 22 ppm arsenic as $AsCl_3$. The vanadium had previously been removed from the starting crude $TiCl_4$ using a commercial organic treating agent followed by distillation. At room temperature 1 g of elemental powdered sulfur, 1 g of anhydrous $FeCl_3$ and 3 g of powdered elemental Sn (10 micron size, Aldrich, 98.8%) were added to the stirring $TiCl_4$. The mixture was heated to reflux temperature and held at reflux for 3 hours. The colorless $TiCl_4$ was then distilled from the solids and collected using the Dean Stark trap. The overheads were measured to contain <5 ppm As.

What is claimed is:

1. A process for arsenic purification of a commercial purified $TiCl_4$ comprising:
   (i) contacting an arsenic-containing commercial purified $TiCl_4$ substantially free of vanadium with elemental sulfur, ferric chloride, and elemental tin; and
   (ii) producing purified $TiCl_4$, $SnCl_4$, and solid arsenic.

2. The process of claim 1 further comprising:
   (iii) separating the purified $TiCl_4$ from the $SnCl_4$.

3. The process of claim 2, wherein the step of separating the purified $TiCl_4$ from the $SnCl_4$ is performed by distillation.

4. The process of claim 1, wherein step (i) is performed at a temperature of at least 100° C.

5. The process of claim 1, wherein step (i) is performed at a temperature in the range of at least about 150° C. to at least about 200° C.

* * * * *